United States Patent
Whaley

(10) Patent No.: US 7,061,494 B1
(45) Date of Patent: Jun. 13, 2006

(54) METHOD AND APPARATUS FOR HARDWARE OPTIMIZATION OF GRAPHICS PIPELINE FUNCTIONS

(75) Inventor: Jeffrey Allan Whaley, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/552,857

(22) Filed: Apr. 20, 2000

(51) Int. Cl.
*G06T 15/00* (2006.01)

(52) U.S. Cl. .................. 345/501; 345/506; 345/426; 345/428; 345/629; 345/559; 345/561; 345/502

(58) Field of Classification Search ............ 345/693, 345/586, 644, 559, 643, 561, 428, 629, 501, 345/506, 426, 502; 706/13
See application file for complete search history.

(56) References Cited

U.S. PATENT DOCUMENTS

| | | | | |
|---|---|---|---|---|
| 5,369,737 A * | 11/1994 | Gholizadeh et al. | ........ | 345/426 |
| 5,517,603 A * | 5/1996 | Kelley et al. | ............... | 345/426 |
| 6,028,590 A * | 2/2000 | Wood et al. | ................ | 345/604 |
| 6,064,392 A * | 5/2000 | Rohner | ....................... | 345/426 |
| 6,198,488 B1 * | 3/2001 | Lindholm et al. | .......... | 345/426 |
| 6,304,265 B1 * | 10/2001 | Harris et al. | ................ | 345/421 |
| 6,603,474 B1 * | 8/2003 | Cobb et al. | ................. | 345/421 |

OTHER PUBLICATIONS

The OpenGL Graphics System: A Specification (Version 1.2); Segal et al.; Mar. 23, 1998.

\* cited by examiner

*Primary Examiner*—Kimbinh T. Nguyen
(74) *Attorney, Agent, or Firm*—Duke W. Yee; Mark E. McBurney; Cathrine K. Kinslow

(57) ABSTRACT

A method and apparatus for optimizing processing of graphics data. An equation for use in processing graphics data is simplified by identifying variables in the equation that remain constant over a set of repeated operations. This simplified equation is implemented in a processing unit containing logic units, wherein the logic units are used to perform a graphics operation in which a set of constants is required for the graphics operation. A first set of connections is present in which these connections connect the logic units to each other, wherein the first set of connections are used to configure the plurality of logic units to determine the set of constants. A second set of connections connecting the logic units are present. This set of connections is used to configure the logic units to perform the graphics operation in which the graphics operation using the constants determined through the first set of connections.

16 Claims, 12 Drawing Sheets

METHOD AND APPARATUS FOR HARDWARE OPTIMIZATION OF GRAPHICS PIPELINE FUNCTIONS

BACKGROUND OF THE INVENTION

1. Technical Field

The present invention relates generally to an improved data processing system and in particular to a method and apparatus for processing data. Still more particularly, the present invention provides a method and apparatus for processing graphics data.

2. Description of. Related Art

Data processing systems, such as personal computers and work stations, are commonly utilized to run computer-aided design (CAD) applications, computer-aided manufacturing (CAM) applications, and computer-aided software engineering (CASE) tools. Engineers, scientists, technicians, and others employ these applications daily. These applications involve complex calculations, such as finite element analysis, to model stress in structures. Other applications include chemical or molecular modeling applications. CAD/CAM/CASE applications are normally graphics intensive in terms of the information relayed to the user. Data processing system users may employ other graphics intensive applications, such as desktop publishing applications. Generally, users of these applications require and demand that the data processing systems be able to provide extremely fast graphics information.

The processing of a graphics data stream to provide a graphical display on a video display terminal requires an extremely fast graphics system to provide a display with a rapid response. In these types of graphics systems, primitives are received for processing and display. A primitive is a graphics element that is used as a building block for creating images, such as, for example, a point, a line, an arc, a cone, or a sphere. A primitive is defined by a group of one or more vertices. A vertex defines a point, an end point of an edge, or a corner of a polygon where two edges meet. Data also is associated with a vertex in which the data includes information, such as positional coordinates, colors, normals, and texture coordinates. Commands are sent to the graphics system to define how the primitives and other data should be processed for display.

Within these graphics systems, a graphics pipeline is used to process this graphics data. With a pipeline, the graphics data processing is partitioned into stages of processing elements in which processing data may be executed sequentially by separate processing elements. These processing elements will incorporate many mathematical equations used to process the graphics data used for display. When implementing these equations in hardware, it is desirable to reduce the size and complexity of the operations performed by the processing elements to efficiently use the hardware resource.

Therefore, it would be advantageous to have an improved method and apparatus for implementing graphics functions in processing elements, such that the complexity and size of the functions are minimized.

SUMMARY OF THE INVENTION

The present invention provides a method and apparatus for optimizing processing of graphics data. An equation for use in processing graphics data is simplified by identifying variables in the equation that remain constant over a set of repeated operations. This simplified equation is implemented in a processing unit containing logic units, wherein the logic units are used to perform a graphics operation in which a set of constants is required for the graphics operation. A first set of connections is present in which these connections connect the logic units to each other, wherein the first set of connections are used to configure the plurality of logic units to determine the set of constants. A second set of connections connecting the logic units is present. This set of connections is used to configure the logic units to perform the graphics operation in which the graphics operation using the constants determined through the first set of connections.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
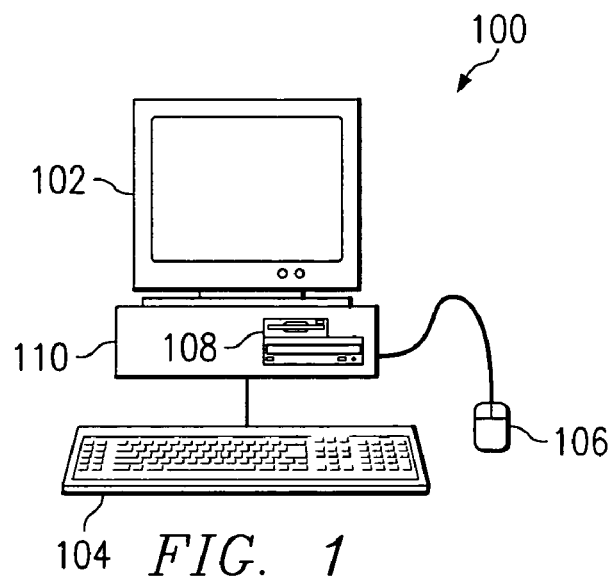
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
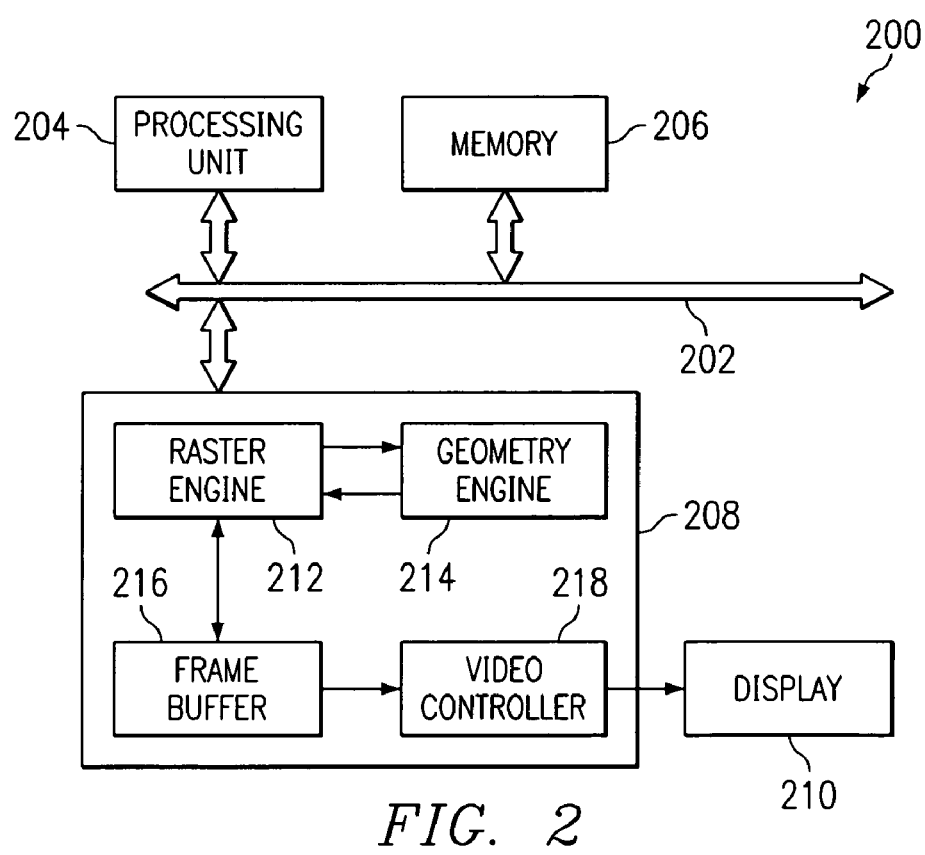
FIG. 2 is a block diagram of a data processing system in accordance with a preferred embodiment of the present invention.

Turning next to FIG. 2, a block diagram of a data processing system is depicted in accordance with a preferred embodiment of the present invention. Data processing system 200 is an example of components used in a data processing system, such as computer 100 in FIG. 1. Data processing system 200 employs a bus 202 in the form of a peripheral component interconnect (PCI) local bus architecture. Although the depicted example employs a PCI bus, other bus architectures such as Accelerated Graphics Port (AGP) and Industry Standard Architecture (ISA) may be used. Processing unit 204, memory 206, and graphics adapter 208 are connected to bus 202 in these examples. Processing unit 204 includes one or more microprocessors in the depicted example.

Graphics adapter 208, in this example, processes graphics data for display on display device 210. The graphics data is received from applications executed by processing unit 204. Graphics adapter 208 includes a raster engine 212, a geometry engine 214, a frame buffer 216, and a video controller 218. Raster engine 212 receives the graphics data from the application. In these examples, raster engine 212 contains the hardware and/or software used to rasterize an image for display. Raster engine 212 is used to turn text and images into a matrix of pixels to form a bit map for display on a screen. In the depicted example, raster engine 212 sends the received graphics data to geometry engine 214, which provides the functions for processing primitives and other graphics data to generate an image for raster engine 212 to process. The processed data is then passed back to raster engine 212. The mechanisms of the present invention are located in geometry engine 214 in these examples.

Frame buffer 216 is an area of memory used to hold a frame of data. Frame buffer 216 is typically used for screen display and is the size of the maximum image area on the screen. Frame buffer 216 forms a separate memory bank on graphics adapter 208 to hold a bit map image while it is "painted" on a screen. Video controller 218 takes the data in frame buffer 216 and generates a display on display 210. Typically, video controller 218 will cycle through frame buffer 216 one scan line at a time.

Figure 3:
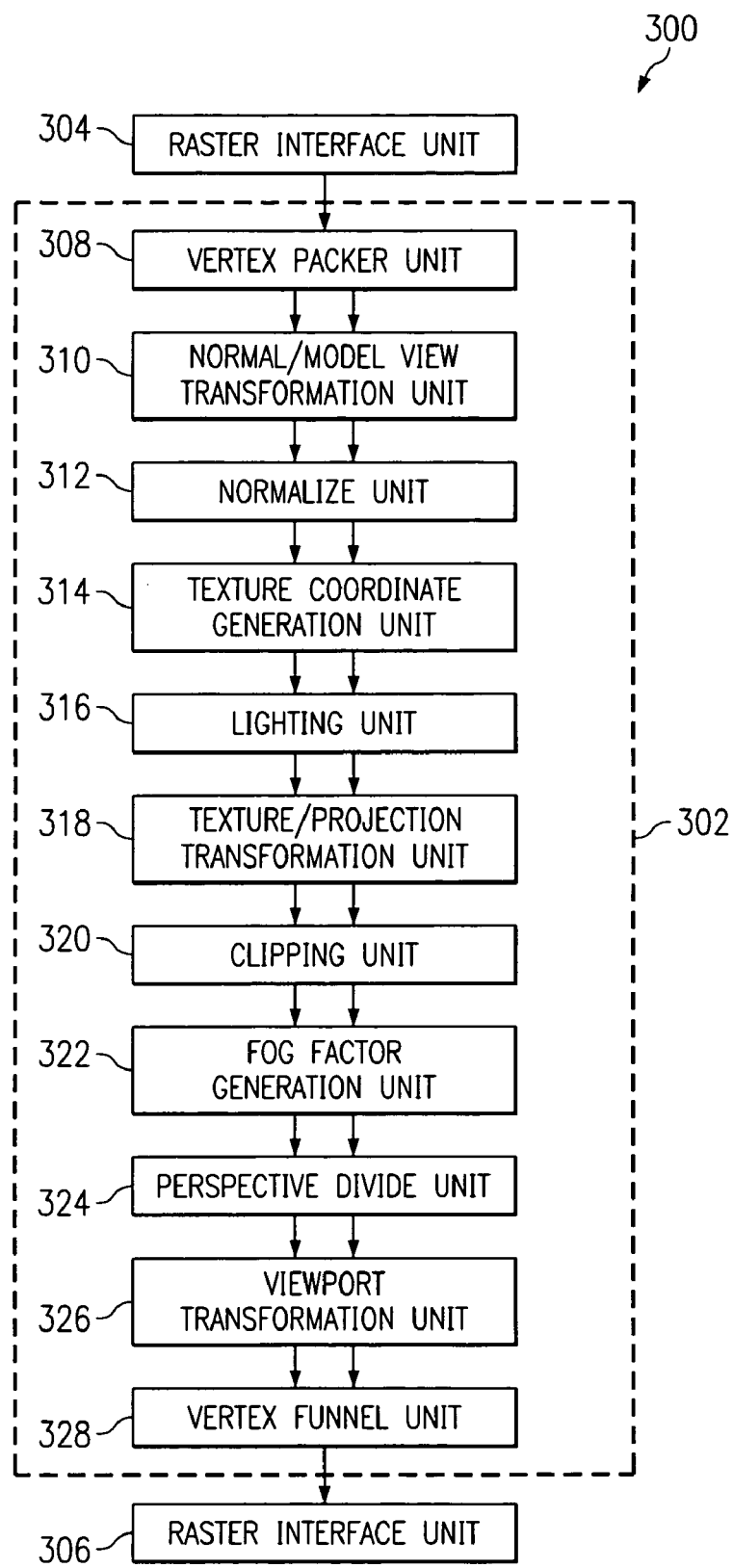
FIG. 3 is a block diagram of a geometry engine in accordance with a preferred embodiment of the present invention.

Turning now to FIG. 3, a block diagram of a geometry engine is depicted in accordance with a preferred embodiment of the present invention. Geometry engine 300, in this example, includes a geometry unit 302, a raster interface unit 304, and a raster interface unit 306. Data is received by raster interface unit 304 for processing within geometry unit 302. The data is received from a raster engine, such as raster engine 210 in FIG. 2. Processed data is returned to the raster engine using raster interface unit 306. The mechanism of the present invention is implemented within the processing elements in geometry unit 302. Specifically, the processing elements implement equations in hardware to process graphics data. The mechanism of the present invention reduces the complexity of the hardware by optimizing the equations in a simpler form and implementing these simplified equations in the processing elements.

Geometry unit 302, in this example, is a graphics pipeline containing a set of processing elements, which include a vertex packer unit 308, a normal/model view transformation unit 310, a normalize unit 312, a texture coordinate generation unit 314, a lighting unit 316, a texture/projection transformation unit 318, a clipping unit 320, a fog factor generation unit 322, a perspective divide unit 324, a viewport transformation unit 326, and a vertex funnel unit 328.

Vertex packer unit 308 is the top stage of a geometry unit and assembles attribute fields for a vertex. A vertex defines a point, an end point of an edge, or a corner of a polygon where two edges meet. Each vertex contains every possible fragment of data used by any stage in the geometry pipeline. These fragments are data, such as, for example, positional coordinates, colors, normals, and texture coordinates. Normal/model view transformation unit 310 is used to transform object coordinates into the world-coordinate system. XYZ vertices, normals, and texture coordinates are transformed before their coordinates are used to produce an image in the frame buffer. This function is performed by transforming the vertices of each polygon with a single transformation matrix that is the concatenation of the individual modeling transformation matrices.

Normalize unit 312 performs normalization function of vertices that have been transformed. Places each vertex back into a normal with reference to a single decimal point. In other words, the normalize unit removes any skewing caused by matrix multiplication in normal/model view transformation unit 310. Texture coordinate generation unit 314 generates texture coordinates used for displaying texture for a primitive. Texture coordinate generation unit 314 calculates texture values for each texture coordinate by transforming from one coordinate system into one required for the texture coordinate. Texture coordinates associated with a vertex may either be taken from the current texture coordinates or generated according to a function dependent on vertex coordinates.

Lighting unit 316 computes shading and colors for each vertex. The lighting unit applies lighting models or shading models to a vertex, which may take into account factors, such as ambient light, diffuse reflection, and specular reflection. The shading may be determined using various processes, such as constant, Gouraud, or Phong. Texture/projection transformation unit 318 changes the form or shape of a primitive.

Clipping unit 320 identifies a portion of a primitive lying within a clip region. A clip region is typically either a window on a screen or a view volume. Fog factor generation unit 322 is used to make an object less visible as it is further away from the viewpoint. Typically, mist is generated in front of the object as the object is located further and further away from the viewpoint.

Perspective divide unit 324 is used to generate normalized device coordinates from the incoming coordinates. This unit takes coordinates from fog factor generation unit 322 and divides them by w to generate normalized device coordinates for use by viewpoint transformation unit 326. Viewpoint transformation unit 326 takes primitives in normalized device coordinates and transforms them to window coordinates. Device coordinates are coordinates used by the adapter to display images. Normalized device coordinates are device coordinates that are normalized to between 0 and 1. Vertex funnel unit 328 takes fragments of vertices and places them on a bus for use by the raster interface unit. In this example, the fragments are funneled into a 64-bit data word for transfer on the bus.

The present invention provides an improved method and apparatus for implementing graphics functions in processing elements. This advantage includes increased performance through the reduction in size and complexity of the hardware and operations used to perform the functions. The optimization of these processing elements involves identifying variables that are essentially constant over a number of operations in a processing element and using these identifications to simplify equations for functions. The simplified equations require less logic and less time to perform in a processing element. In these cases, the identified variables are typically constant for a long period of time. Multiple calculations may be performed in the processing element using the same constants.

The mechanism of the present invention may be implemented in any of the processing elements in a graphics pipeline. Examples using fog factor generation unit 322 and viewport transformation unit 326 are described below.

A graphics data stream primarily consists of two types of elements, which are commands and vertex data. Commands are used to set state and processing attributes. Vertex data has various transformations applied before being rendered to the screen. The vertex data comprises the vast majority of the data being sent through the graphics system. The present invention recognizes that many of the attributes that are set with a command will remain essentially constant for many operations over a long period of time. This situation allows for manipulation of a pipeline equation for implementation in a processing element.

The linear mode fog equation for the OpenGL pipeline is defined as:

$$Fog=(End-|Z_E|)/(End-Start)$$

The variable End is a far distance value, the variable Start is a near distance value, and $Z_E$ is the eye-coordinate distance between the viewpoint and the fragment center value. The End and Start are used to define distances in which fogging is to occur. More information on OpenGL and various OpenGL defined functions may be found in *The OpenGL Graphics System: A Specification (Version 1.2)*, which is available from Silicon Graphics, Inc., 2011 North Shoreline Boulevard, Mountain View, Calif. 94039-7311. OpenGL is a trademark of Silicon Graphics, Inc.

At first glance, this equation appears to consist of three arithmetic operations, which are two subtractions and one division. However, the division operation is actually implemented in hardware as the reciprocal of the denominator multiplied by the numerator. Therefore, the equation actually consists of four arithmetic operations.

In the context of OpenGL linear fog operations, the Start and End variables are essentially constant. This allows the equation to be reduced as follows:

$$constant1=End-Start$$

$$constant2=1/constant1$$

$$constant3=End*constant2$$

$$Fog=(End-|Z_E|)/(End-Start)$$

$$=(End-|Z_E|)/constant1$$

$$=(End-|Z_E|)*constant2$$

$$=End*constant2-|Z_E|*constant2$$

$$=constant3-|Z_E|*constant2$$

By precalculating the constants and storing constant2 and constant3 for later use, the original equation is now reduced to a simple slope equation, which requires two arithmetic operations. The constants do not need to have dedicated arithmetic units; the pipeline is temporarily suspended when the command is processed that sets Start and End, and the constants are calculated using shared units.

Similarly, the linear mode fog equation for the graPHIGS pipeline can be reduced as follows when one knows that upper scale factor (USF) and lower scale factor (LSF) remain essentially constant. USF serves as an upper clamp while the LSF serves as a lower clamp for the calculation.

$$constant1=End-Start$$

$$constant2=1/constant1$$

$$constant3=End*constant2$$

$$constant4=USF-LSF$$

$$constant5=constant2*constant4$$

$$constant6=constant3*constant4$$

$$constant7=constant6+LSF$$

$$Fog=[(End-Z)/(End-Start)]*(USF-LSF)+LSF$$

$$=[(End-Z)/constant1]*(USF-LSF)+LSF$$

$$=[(End-Z)*constant2]*(USF-LSF)+LSF$$

$$=(End*constant2-Z*constant2)*(USF-LSF)+LSF$$

$$=(constant3-Z*constant2)*(USF-LSF)+LSF$$

$$=(constant3-Z*constant2)*constant4+LSF$$

$$=constant3*constant4-Z*constant2*constant4+LSF$$

$$=constant6-Z*constant5+LSF$$

$$=constant7-Z*constant5$$

This manipulation of the equations for generating a fog factor provides much more savings by reducing a formula with seven arithmetic operations down to two. With this reduction in operations, the complexity of a processing element, such as fog factor generation unit 322 in FIG. 3, implementing these equations may be reduced.

Figure 4:
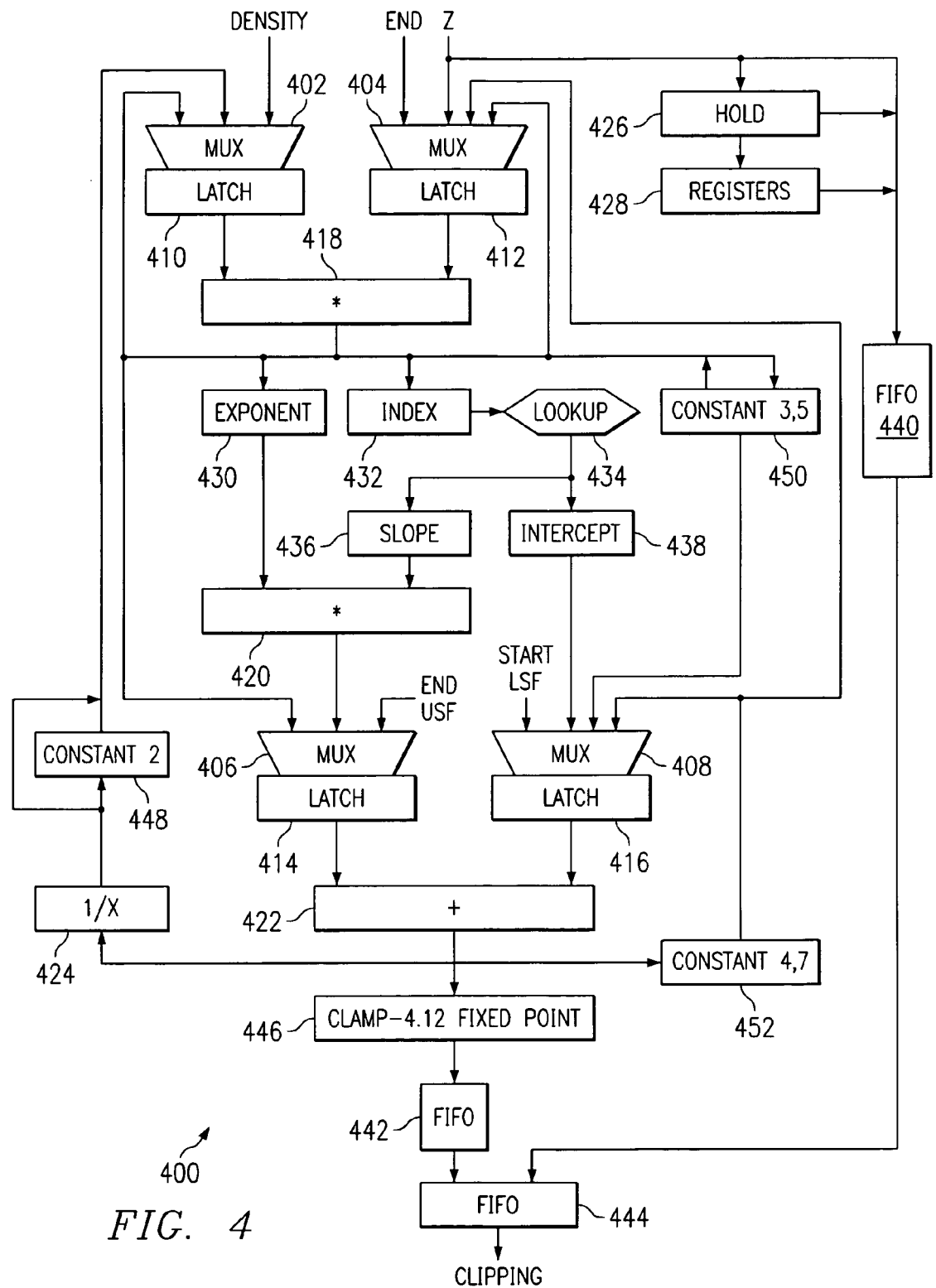
FIG. 4 is a logic diagram of a fog factor generation unit in accordance with a preferred embodiment of the present invention.

With reference next to FIG. 4, a logic diagram of a fog factor generation unit is depicted in accordance with a preferred embodiment of the present invention. Fog factor generation unit 400 is an example implementation of fog factor generation unit 322 in FIG. 3. Fog factor generation unit 400 includes multiple modes of operation. One mode of operation is used for the fog factor calculation, while other modes of operation are used to determine constants for use in performing the fog factor calculation. In this example, fog factor generation unit 400 may be used to implement linear mode fog operations for OpenGL and graPHIGS, as well as OpenGL exponential and exponential squared mode fog operations. Some of these operations are implemented using linear mode equations for OpenGL and graPHIGS as described above.

Fog factor generation unit 400 includes multiplexers 402, 404, 406, and 408 to receive and select data for fog operations. Latches 410, 412, 414, and 416 are used to hold the data received by the multiplexers. Multiplexer 402 is configured to receive a value for the variable density, as well as values generated from other components within fog factor generation unit 400. Multiplexer 404 is configured to receive values for the variables End and Z, as well as values from other components within fog factor generation unit 400. Multiplexer 406 is configured to receive values for the variables End and upper scale factor (USF), as well as values from other components within fog factor generation unit 400. Multiplexer 408 is configured to receive values for the variables Start and lower scale factor (LSF), as well as values from other components within fog factor generation unit 400.

Fog factor generation unit 400 includes a multiplication unit 418, multiplication unit 420, addition unit 422, and reciprocal unit 424. Multiplication units 418 and 420 are used to multiply values input into these units. Addition unit 422 adds values, while reciprocal unit 424 generates the reciprocal of a value input into this unit.

Hold unit 426 is used to hold values prior to the values being placed into registers 428. Hold unit 426 may receive new values for another fog operation and hold those values until the current operation using values in register 428 has been completed. In these examples, registers 428 are used to hold values.

Exponent unit 430 is used to hold an exponent, which, in this example, is generated through the input of a density value and a Z value into multiplexers 402 and 404, respectively. In these examples, the density is the fog density and is equal to or greater than 0. These values are multiplied to form and exponent held by exponent unit 430. Index unit 432 calculates an index into lookup unit 434 based on the value generated by multiplication unit 418 receiving the values for density and Z. In these examples, Z is received as an absolute value by multiplication unit 418. The absolute value may be obtained as part of a function provided by multiplexer 404. The result of calculating an index into lookup unit 434 provides a slope 436 and an intercept 438. These values are used in fog calculations depending on the particular mode of operation present in fog factor generation unit 400.

Next, first-in-first-out (FIFO) units 440, 442, and 444 are used to hold data prior to the data being sent to the next processing element, such as clipping unit 320 in FIG. 3. Clamp unit 446 receives the fog factor generated in fog factor generation unit 400 and cuts off the result to provide a signed 16 bit value prior to the factor being output. In this example, the clamp is a 4.12 fixed point clamp in which 1 signed bit, integer bits and 12 decimal bites are present. Constant unit 448 is used to hold constant2, constant unit 450 is used to hold constant3 and constant5, and constant unit 452 is used to hold constant4 and constant7. The data flows illustrated in these examples are for the linear mode fog factors.

Figure 5:
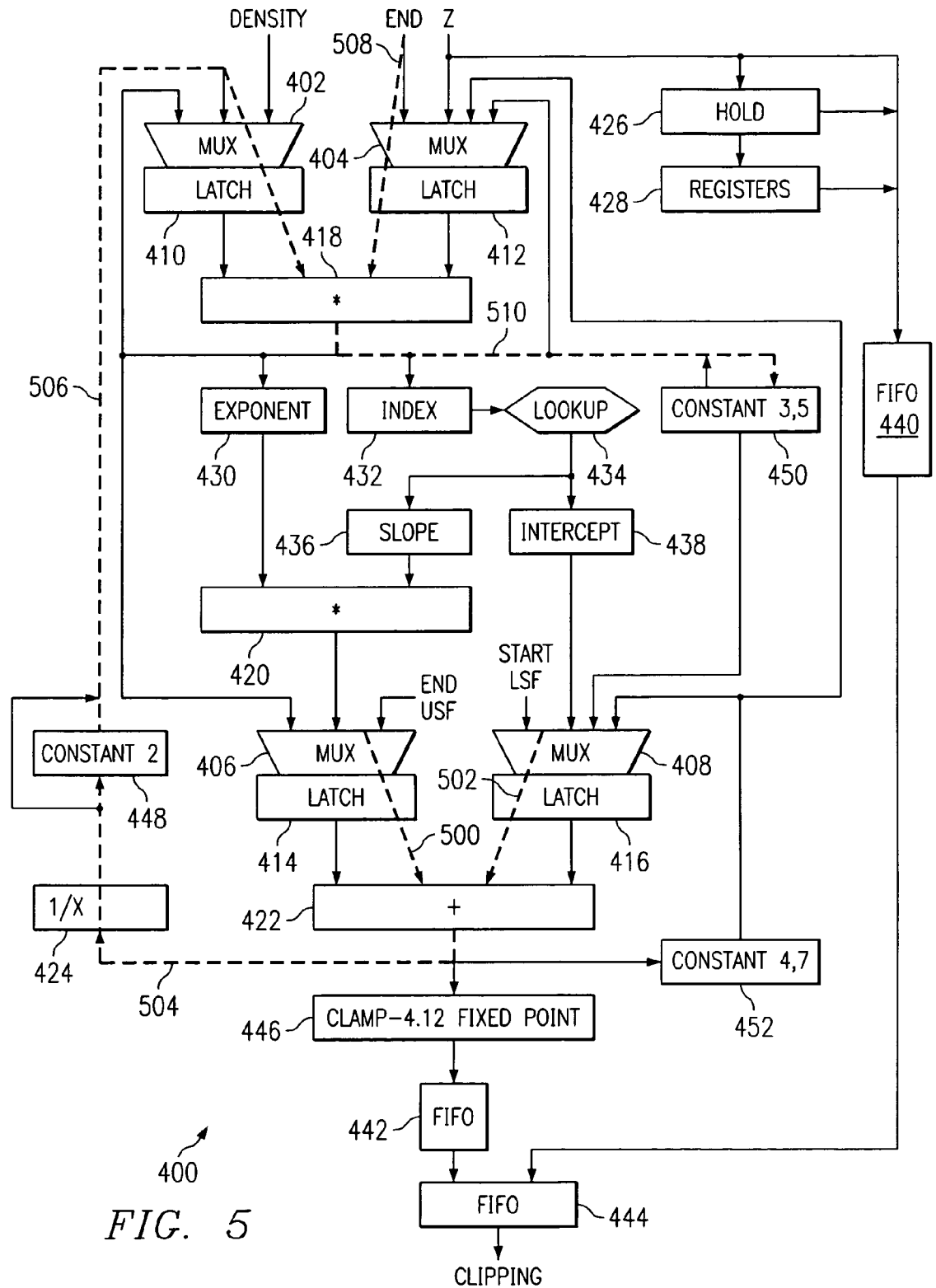
FIG. 5 is a diagram of data flow used to calculate constant1, constant2, and constant3 for a fog operation in accordance with a preferred embodiment of the present invention.

With reference now to FIG. 5, a diagram of data flow used to calculate constant1, constant2, and constant3 for a fog operation is depicted in accordance with a preferred embodiment of the present invention. In FIG. 5, fog factor generation unit 400 is in a mode of operation used to calculate constants used in a fog factor operation.

In this example, constant1 may be determined by generating a negative value for Start using multiplexer 408 and adding that value with the value for End selected by multiplexer 406 in addition unit 422. The output of addition unit 422 is sent to reciprocal unit 424 to generate constant2, which is the reciprocal of constant1. This value is stored in constant unit 448. This data flow is illustrated by paths 500, 502, and 504. Constant3 is generated by multiplexer 404 selecting the value for variable End and multiplexer 402 selecting the value for constant2 from constant unit 448. These values are multiplied by multiplication unit 418 with the resulting value being stored in constant unit 450. The data flow for this operation is illustrated by paths 506, 508, and 510.

Figure 6:
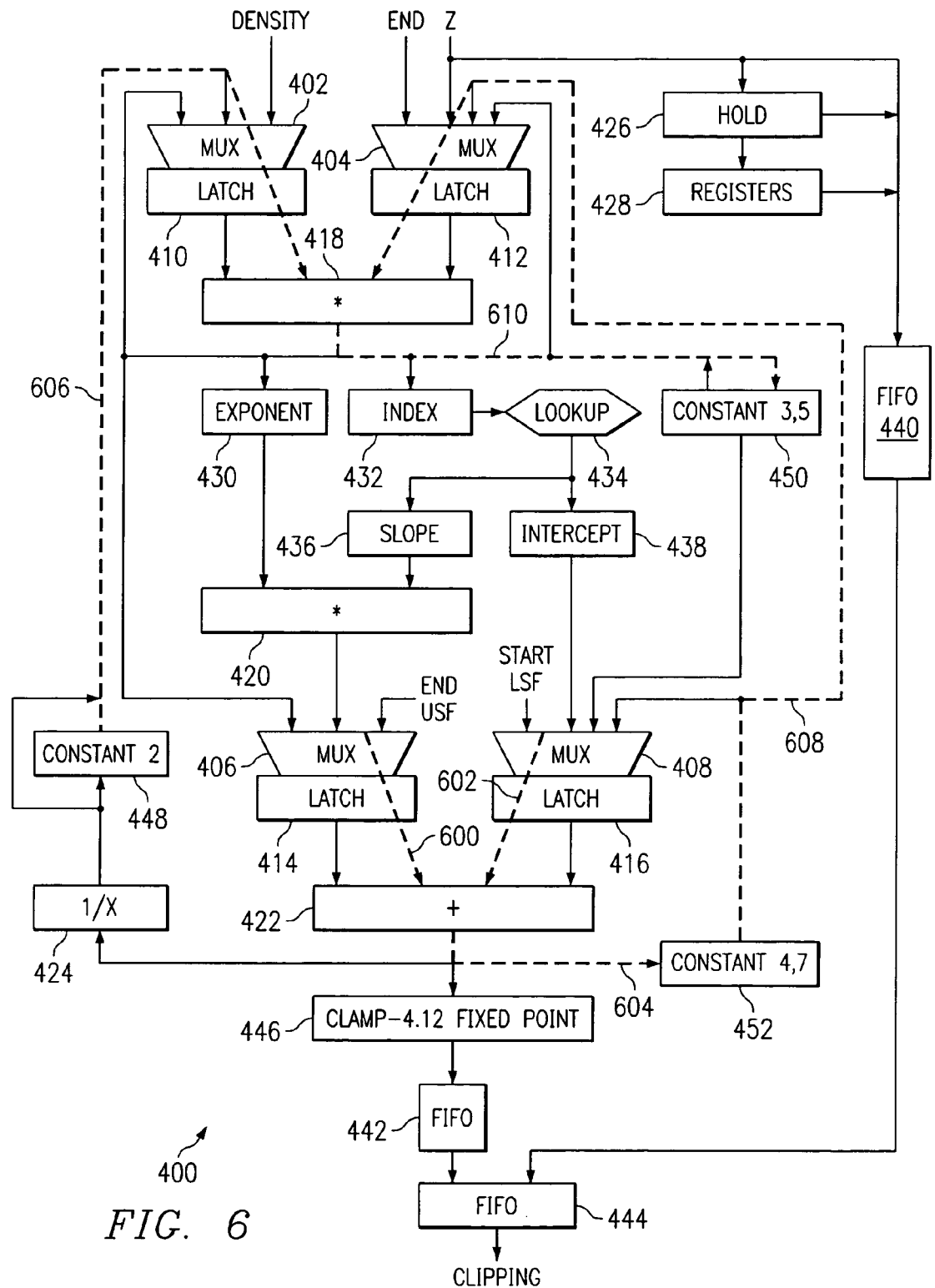
FIG. 6 is a diagram of data flow used to calculate constant4 and constant5 for a fog operation in accordance with a preferred embodiment of the present invention.

Turning next to FIG. 6, a diagram of data flow used to calculate constant4 and constant5 for a fog operation is depicted in accordance with a preferred embodiment of the present invention. In this mode of operation, the calculation of constant4 begins with multiplexer 406 and multiplexer 408 receiving values for the variables USF and LSF. These values are summed or added by addition unit 422 with the result being stored in constant unit 452 as constant4. The data flow for this operation is illustrated by paths 600, 602, and 604.

The determination of constant5 begins with the selection of constant2 from constant unit 448 and constant 4 from constant unit 452 for multiplication by multiplication unit 418 using multiplexers 402 and 404 to select these values. The data flow for this operation is illustrated by paths 606, 608, and 610.

Figure 7:
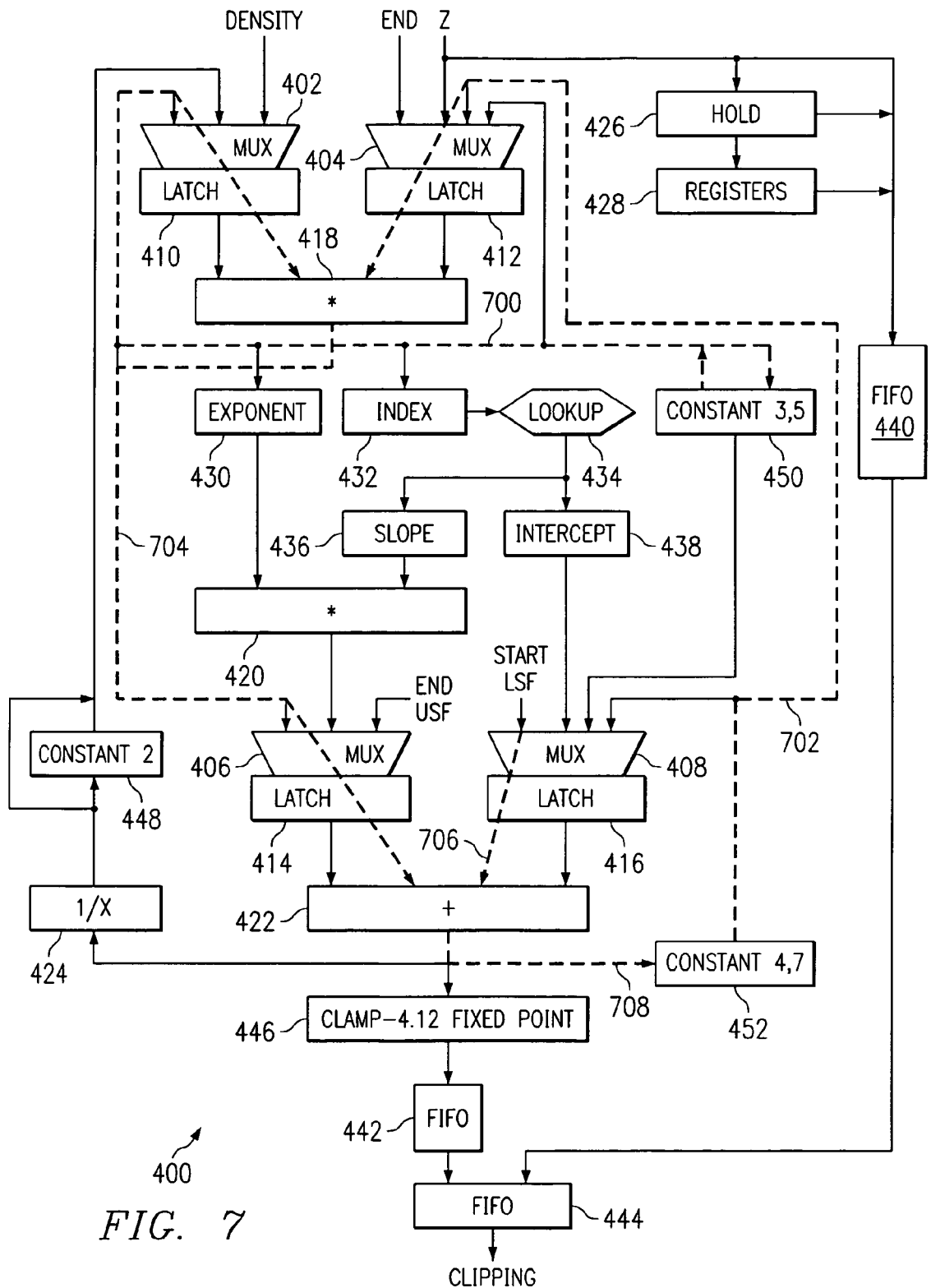
FIG. 7 is a diagram of data flow used to calculate constant6 and constant7 for a fog operation in accordance with a preferred embodiment of the present invention.
Figure 8:
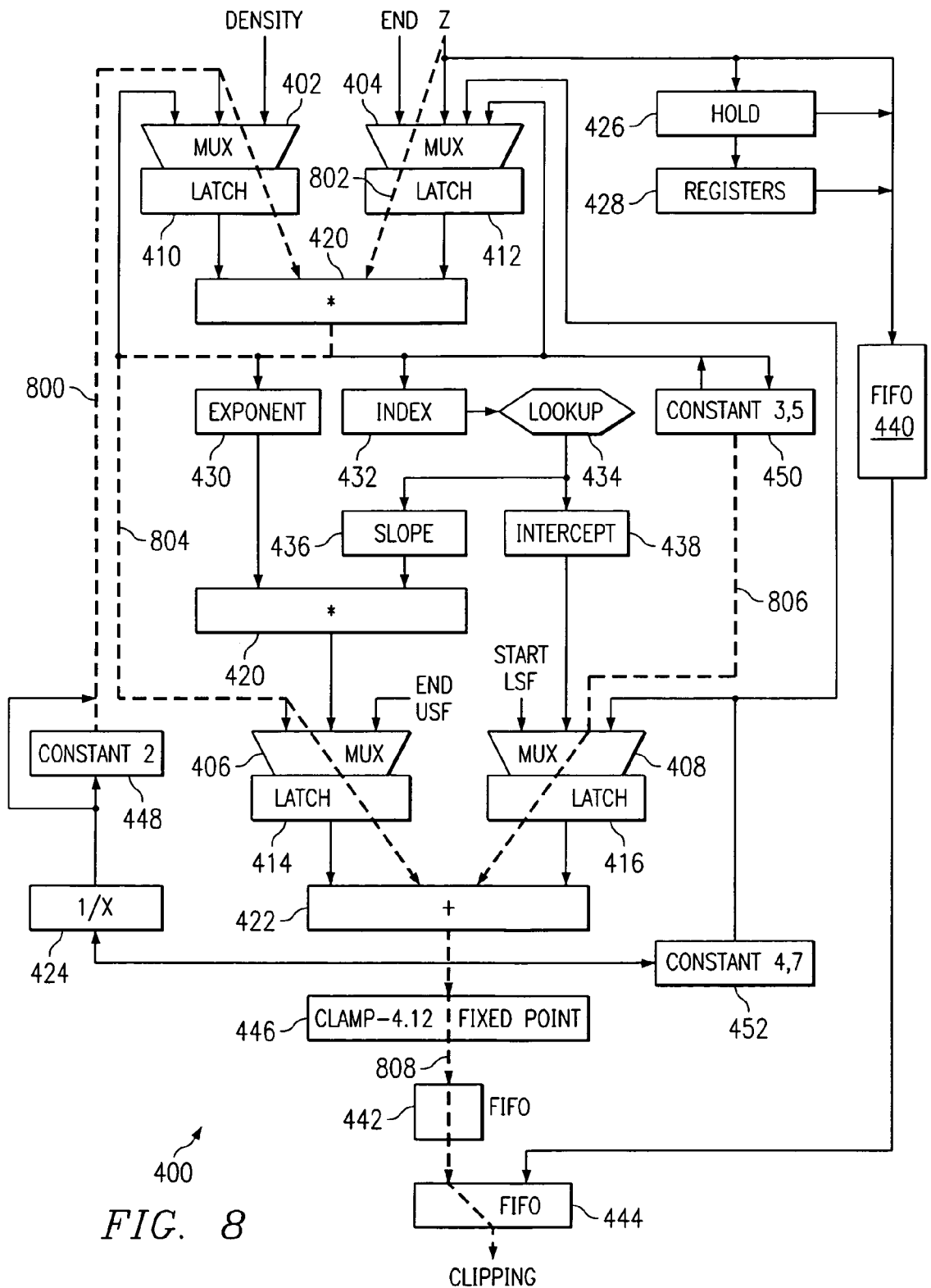
FIG. 8 is an illustration of data flow used to calculate an OpenGL linear mode fog factor in accordance with a preferred embodiment of the present invention.

Turning next to FIG. 7, a diagram of data flow used to calculate constant6 and constant7 for a fog operation is depicted in accordance with a preferred embodiment of the present invention. In this mode of operation, the calculation of constant6 begins with a selection of constant3 from constant unit 450 and a selection of constant4 from constant unit 452 using multiplexers 402 and 404. These values are multiplied by multiplication unit 418 to generate constant6. In this example, constant6 is not stored in a register because it is used immediately to generate constant7. The generation of constant6 is illustrated through paths 700 and 702. Constant7 is generated by selecting the output of multiplication unit 418 and the LSF value through multiplication unit 418 using multiplexers 406 and 408. These values are summed by addition unit 422. The output is stored in constant unit 452. The data flow for this operation is illustrated by paths 704, 706, and 708. Turning now to FIG. 8, an illustration of data flow used to calculate an OpenGL linear mode fog factor is depicted in accordance with a preferred embodiment of the present invention. In this mode of operation, the constants calculated are used to determine the fog factor. In calculating an OpenGL linear mode fog factor, constant3, a Z value, and constant2 are used. The number of operations and the complexity of the hardware required to generate the fog factor are reduced. With multiple operations using the same constants, a performance increase is achieved with reduced hardware because less calculations are required after the initial determination of the constants.

The value received by fog factor generation unit 400 is a Z value, which is put into an absolute form through a manipulation of the sign bit using multiplexer 404. Constant 2 is retrieved by constant unit 408 using multiplexer 402. These two values are multiplied by multiplication unit 418. The result is added with constant 3 from constant unit 450 at addition unit 422 through the use of multiplexers 406 and 408 to generate the fog factor, which is then sent to a clipping unit. The data flow for the generation of the OpenGL linear mode fog factor in fog factor generation unit 400 is illustrated in paths 800, 802, 804, 806, and 808.

Figure 9:
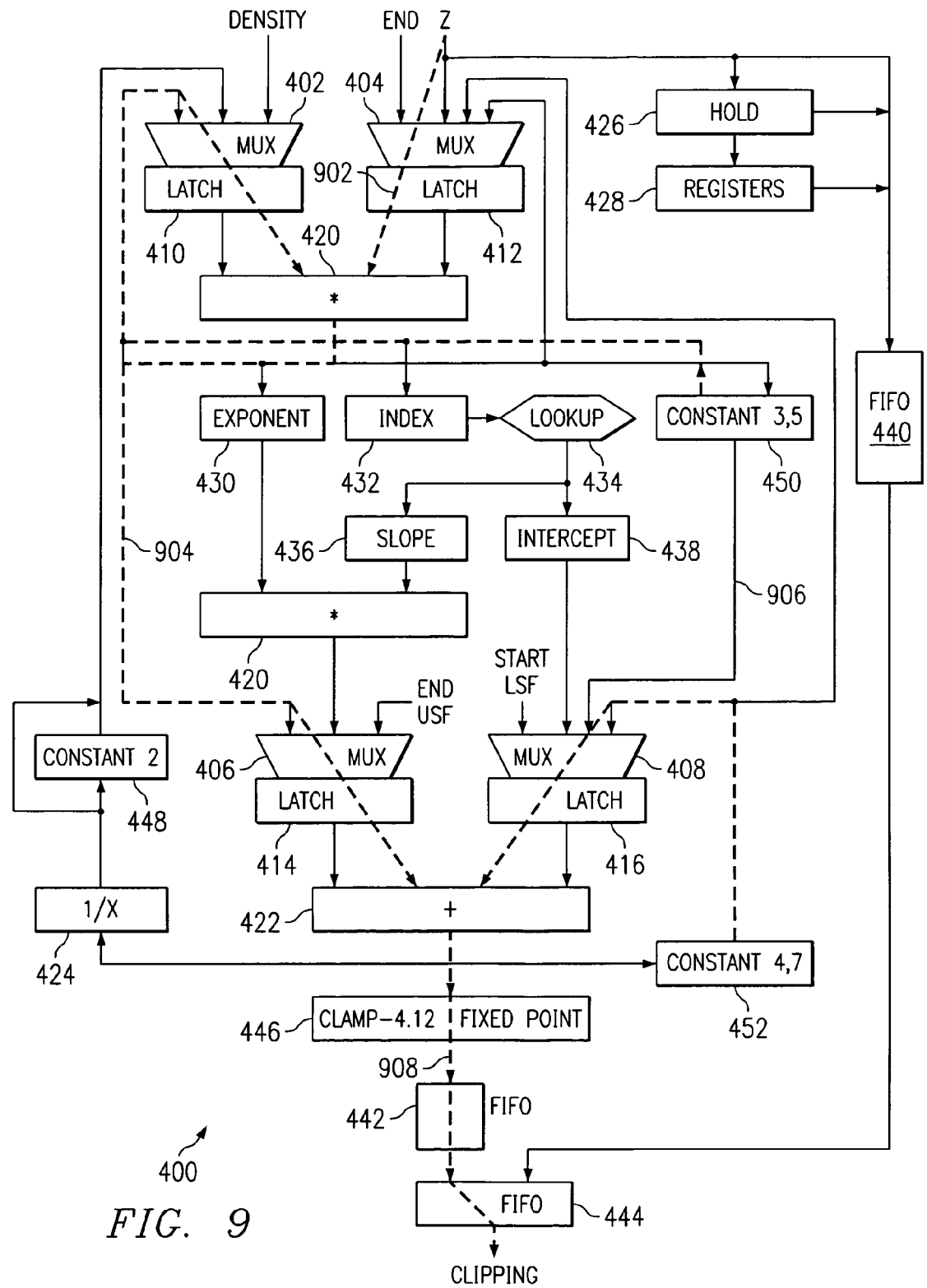
FIG. 9 is a dataflow diagram used to calculate a graPHIGS linear mode fog factor in accordance with a preferred embodiment of the present invention.

Turning now to FIG. 9, a dataflow diagram used to calculate a graPHIGS linear mode fog factor is depicted in accordance with a preferred embodiment of the present invention. In this mode of operation, the contents are used to determine a graPHIGS linear mode factor. As with calculating the OpenGL linear mode fog factor, the constants, previously calculated, are used in determining the fog factor. As with the other mode of operation for calculating an OpenGL linear mode fog factor, the number of operations and the complexity of the hardware required to generate this particular type of fog factor also are reduced.

The value received by fog factor generation unit 400 is a z value, which is put into absolute form through the manipulation of a sign bit using multiplexer 404. This z value is multiplied with constant 5, which is received from constant unit 450 through multiplexer 402. The values are multiplied together at multiplication unit 420 with the result being subtracted from constant 7. Constant 7 is retrieved from constant unit 452 using multiplexer 408. Subtraction is carried out using addition unit 422 by changing the sign of multiplication unit 420. This change in sign is accomplished using multiplexer 406 in these examples. The output of addition unit 422 is the fog factor and is sent on to a clipping unit. The dataflow for the generation of the graPHIGS linear mode is illustrated through paths 900, 902, 904, 906, and 908. The calculation of this type of fog factor also shares logic units with those used in the calculation of constants.

As illustrated above, the calculations of constants use units, which are shared with those used in the fog calculation.

The viewport transformation equations for the OpenGL pipeline can also be reduced when one knows that Xbias, Ybias, Far, and Near also are expected to remain essentially constant.

$$Xconstant = Xbias + 6 \times 2^{11}$$

$$Xwindow = Xscale*Xndc + Xbias + 6 \times 2^{11}$$

$$= Xscale*Xndc + Xconstant$$

$$Yconstant = Ybias + 6 \times 2^{11}$$

$$Ywindow = Yscale*Yndc + Ybias + 6 \times 2^{11} = Yscale*Yndc + Yconstant$$

$$Zconstant1 = Far - Near$$

$$Zconstant2 = Far + Near$$

$$Zconstant3 = 0.5*Zconstant1$$

$$Zconstant4 = 0.5*Zconstant2$$

$$Zconstant5 = Zconstant4 + 1.25 \times 2^{28}$$

$$Zwindow = 0.5*(Far-Near)*Zndc + 0.5*(Far+Near) + 1.25 \times 2^{28}$$

$$= 0.5*Zconstant1*Zndc + 0.5*Zconstant2 + 1.25 \times 2^{28}$$

$$= Zconstant3*Zndc + Zconstant4 + 1.25 \times 2^{28}$$

$$= Zconstant3*Zndc + Zconstant5$$

Figure 10:
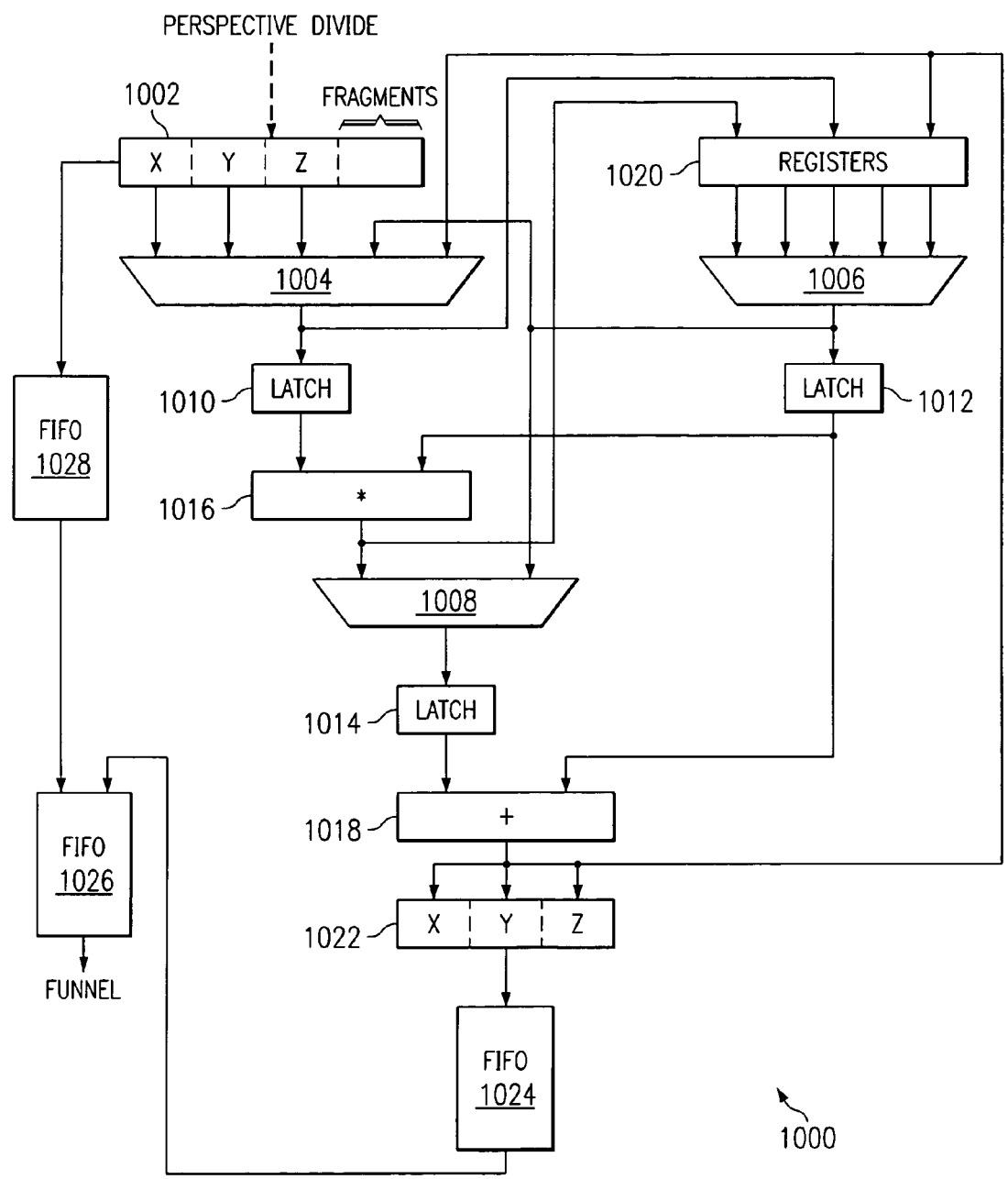
FIG. 10 is a logic diagram of a viewport transformation unit in accordance with a preferred embodiment of the present invention.

Turning now to FIG. 10, a logic diagram of a viewport transformation unit is depicted in accordance with a preferred embodiment of the present invention. Viewport transformation unit 1000 is an example of an implementation of viewport transformation unit 326 in FIG. 3. Viewport transformation unit 1000 receives a vertex from a processing element, such as perspective divide unit 324 in FIG. 3. In this example, the viewport transformation illustrated implements equations for an OpenGL viewport transformation. Viewport transformation unit 1000 includes multiple modes of operation. One or more modes of operation in this viewport transformation unit include calculating constants for the viewport transformation, while another mode of operation is used to perform the viewport transformation operation.

Register 1002 holds an example of vertex information for a vertex received by viewport transformation unit 1000. Multiplexers 1004, 1006, and 1008 are used to select data from different sources for performing viewport transformation operations. Multiplexer 1004 selects values from variables X, Y, and Z values in vertex 1002, as well as from other components in viewport transformation unit 1000. Multiplexer 1006 is used to select values from registers 1020. Additionally, multiplexer 1006 also may include logic to change the sign of a value by manipulating the bit associated with the sign of the value. Multiplexer 1006 also is configured to output a constant value, such as, for example, 0.5 for use calculations within viewport transformation unit 1000. Further, multiplexer 1006 includes multiple outputs to allow for selection of multiple values to be sent to other components simultaneously. Multiplexer 1008 is used to select values from different components within viewport transformation unit 1000.

Latches 1010, 1012, and 1014 are used to hold data selected by the multiplexers until an operation occurs. Multiplication unit 1016 and addition unit 1018 are used in calculating constants, as well as in performing viewport transformation operations. These units are shared by both operations involving calculations of constants, as well as in performing viewport transformations.

Registers 1020 are used to store constants, as well as other information used in performing viewport transformation operations. Registers 1022 is used to receive X, Y, and Z values. FIFOs 1024, 1026, and 1028 are used to hold transformed data, as well as other information to be passed on to the next processing element, which is, in this example, vertex funnel unit 328 in FIG. 3.

Figure 11:
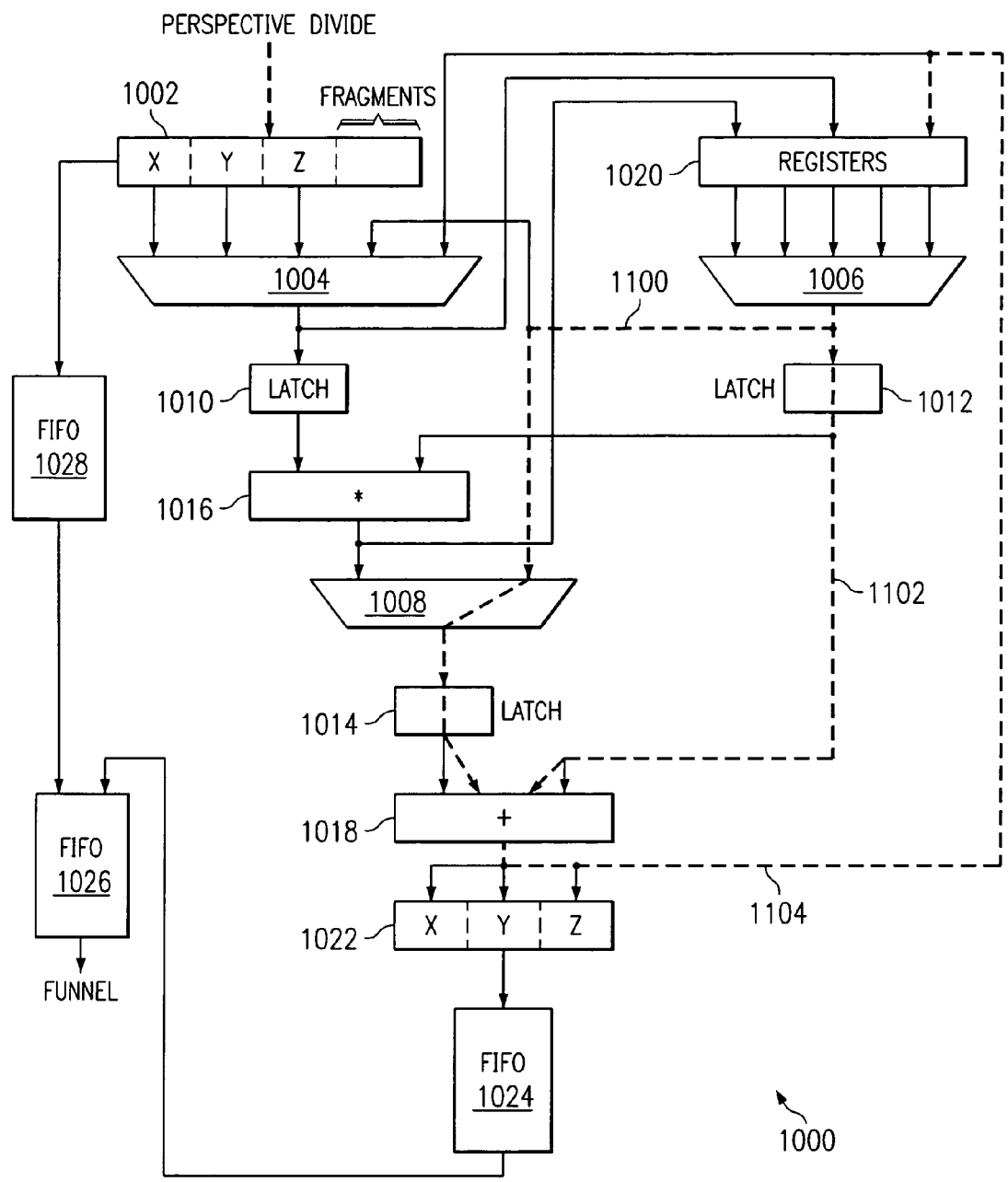
FIG. 11 is an illustration of data flow used to calculate a Zconstant1 and a Zconstant2 for use in a viewport transformation operation in accordance with a preferred embodiment of the present invention.

In these examples, only the X, Y, and Z values are used from vertex 1002. The other portions or fragments of vertex 1002 are passed directly to FIFO 1028 for recombination with transformed values in FIFO 1026. Turning now to FIG. 11, an illustration of data flow used to calculate a Zconstant1 and a Zconstant2 for use in a viewport transformation operation is depicted in accordance with a preferred embodiment of the present invention. In this example, viewport transformation unit 1000 is in a mode of operation to calculate constants Zconstant1 and Zconstant2. Zconstant1 is calculated by selecting the values for the variables Far and Near from registers 1020 through multiplexer 1006. The sign of the value for the Near variable is reversed to perform a subtraction of these two values at addition unit 1018. The result is stored in registers 1020 for later use in performing the viewport transformation operation.

The value for Zconstant2 is determined by selecting the values for the variable Far and Near from registers 1020. In this case, no changes to the sign for the value for Near is made. These two values are summed at addition unit 1018 with the resulting value being stored in registers 1020. The data flow for these calculations are illustrated by paths 1100, 1102, and 1104.

Figure 12:
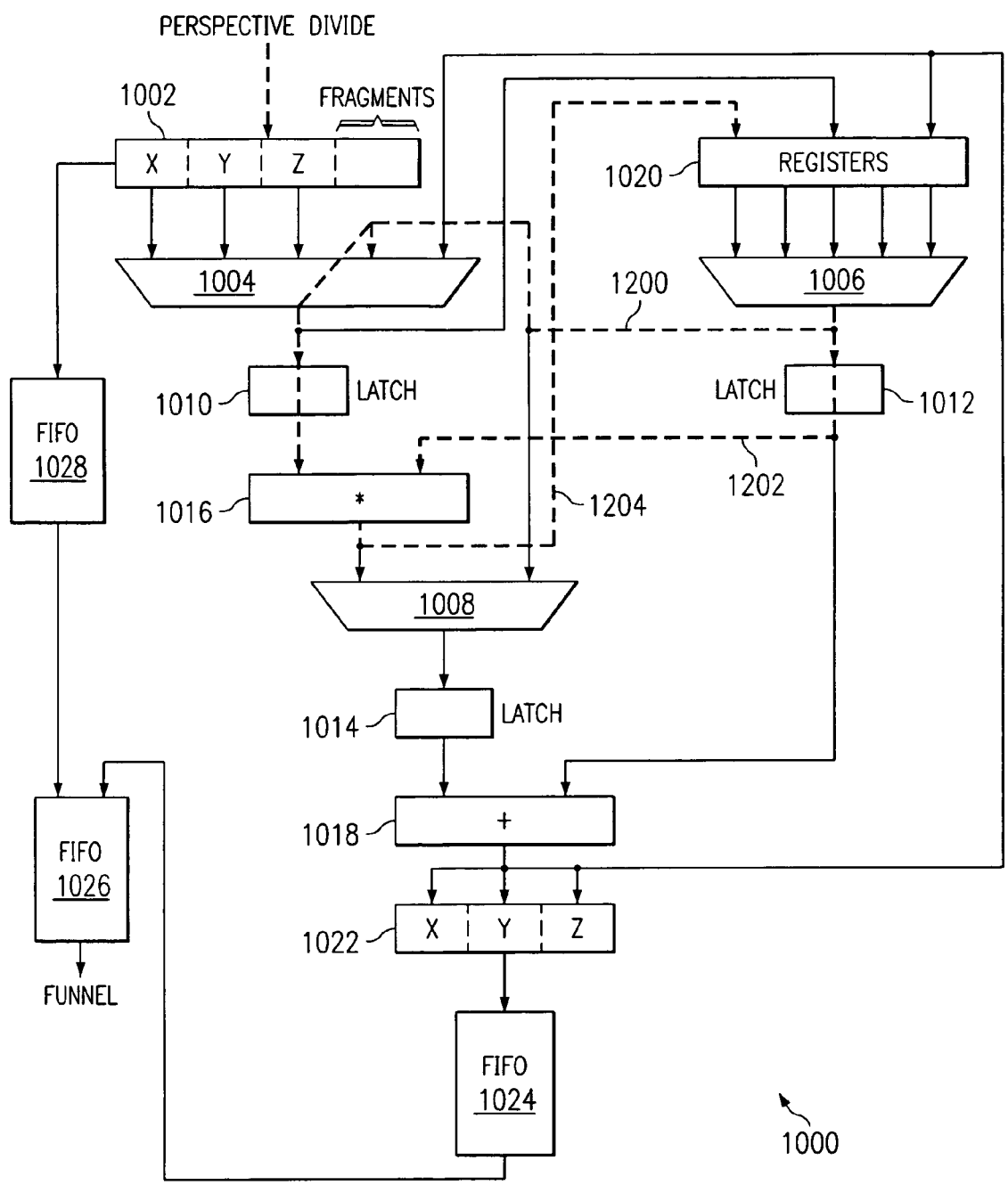
FIG. 12 is an illustration of data flow used to calculate a Zconstant3 and a Zconstant4 for use in a viewport transformation operation in accordance with a preferred embodiment of the present invention.

Turning now to FIG. 12, an illustration of data flow used to calculate a Zconstant3 and a Zconstant4 for use in a viewport transformation operation is depicted in accordance with a preferred embodiment of the present invention. In this example, viewport transformation unit 1000 is configured to calculate the values for Zconstant3 and Zconstant4. Zconstant3 is determined by selecting the value for Zconstant1 from registers 1020 and outputting value of 0.5 from multiplexer 1006. These two values are multiplied together at multiplication unit 1016 with the result being stored in registers 1020 as Zconstant3.

A similar operation is performed to obtain the value for Zconstant4. In this case, the value for Zconstant2 is selected from registers 1020 using multiplexer 1006. Additionally, the value 0.5 is also generated by multiplexer 1006. These two values are multiplied together by multiplication unit 1016 with the result being stored in registers 1002 as Zconstant4. The data flow for these operations are illustrated by paths 1200, 1202, and 1204. In these examples, Zconstant5 is not calculated but is applied through shifting the decimal point of the data.

Figure 13:
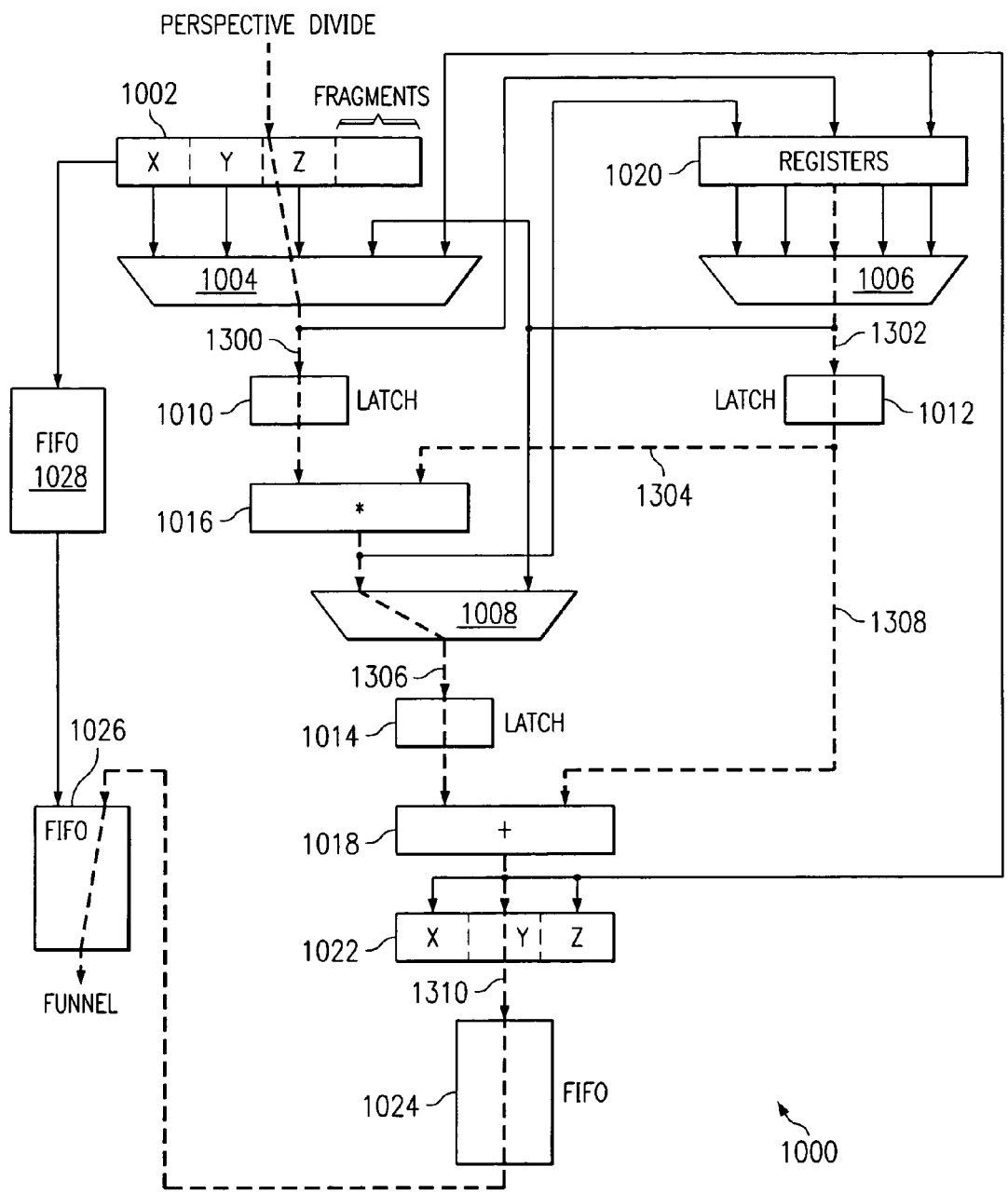
FIG. 13 is an illustration of data flow used to perform a viewport transformation operation in accordance with a preferred embodiment of the present invention.

Turning next to FIG. 13, an illustration of data flow used to perform a viewport transformation operation is depicted in accordance with a preferred embodiment of the present invention. In this example, viewport transformation unit 1000 is in a mode of operation used to perform a viewport transformation operation using the constants determined previously.

The viewport transformation operation is performed by retrieving the Z value from vertex 1002, Zconstant3, and Zconstant5. The Z value is obtained using multiplexer 1004, while Zconstant3 and Zconstant5 are obtained using multiplexer 1006. Zconstant3 and the Z value are multiplied together at the multiplication unit 1016. The result of this operation is sent to addition unit 1018 through multiplexer 1008 to be added to Zconstant5. The output of addition unit 1018 is a viewport transformation of the Z value. This transformed value is sent through FIFOs 1024 and 1026 for transport to the next processing element, which in this case, is vertex funnel unit 328 in FIG. 3.

The data flow for this viewport transformation operation is illustrated through paths 1300, 1302, 1304, 1306, 1308, and 1310. As can be seen, the data flows for performing the viewport transformation share components used in calculating the constants. Additionally, further viewport transformations also may use the same constants. With these situations, the number of operations used to perform a viewport transformation is reduced in addition to simplifying the complexity of this processing unit. In these examples, only the Z value is illustrated. Similar calculations in transformations are performed for X and Y values in the vertex.

Thus, the present invention provides an improved method and apparatus for implementing graphics functions in processing elements. This advantage includes increased performance through the reduction in size and complexity of the hardware and operations used to perform the functions. The optimization of these processing elements involves identifying variables that are essentially constant and using these identifications to simplify equations for functions. In these cases, the identified variables are typically constant for a long period of time. Multiple calculations may be performed using the same constants.

Consequently, simplifying the equations used to perform the operation and implementing the simplified equations in the processing elements reduces the complexity of these elements. Further, shared logic elements, such as, for example, addition units and multiplication units are present in which these units are used both to calculate constants and perform the operation. This configuration also reduces the complexity of the processing elements. The constants are determined once and stored in registers and reused as long as the values for these constants do not change for the operation being performed by the processing element.

It is important to note that while the present invention has been described in the context of a fully functioning data processing system, those of ordinary skill in the art will appreciate that the processes of the present invention are capable of being distributed in the form of a computer readable medium of instructions for execution in a computer and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although the depicted embodiments illustrate the processing of graphics data for display on a display device, the mechanisms of the present invention may be applied to processing of graphics data for output on other types of media, such as a hard copy of an image generated by a printer. Additionally, although a particular configuration of processing elements is illustrated, the mechanism of the present invention may be applied to other configurations of processing elements and to other types of processing elements and equations other than those shown above.

The illustrated processes used to simplify the equations and selected the logic elements to implement operations using the simplified equations also may be implemented within a data processing system as computer implemented instructions. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for optimizing processing of graphics data, the apparatus comprising:
   a plurality of logic units, wherein the plurality of logic units are used to perform a graphics operation in which a set of constants is required for the graphics operation;
   a first set of connections connecting the plurality of logic units to each other, wherein the first set of connections are used to configure the plurality of logic units to calculate the set of constants; and
   a second set of connections connecting the plurality of logic units, wherein the second set of connections configure the plurality of logic units to perform the graphics operation in which the graphics operation using the constants is calculated through the first set of connections, wherein the first set of connections and the second set of connections include common connections.

2. The apparatus of claim 1, wherein the graphics operation is a generation of a fog factor.

3. The apparatus of claim 1, wherein the graphics operation is a viewport transformation.

4. The apparatus of claim 1, wherein the constants are stored in a memory.

5. The apparatus of claim 1, wherein the constants are stored in a set of registers.

6. The apparatus of claim 1, wherein the apparatus is a graphics adapter.

7. An apparatus for optimizing processing of graphics data, the apparatus comprising:

a plurality of logic units, wherein the plurality of logic units are used to perform a graphics operation in which a set of constants is required for the graphics operation;

a first set of connections connecting the plurality of logic units to each other, wherein the first set of connections are used to configure the plurality of logic units to calculate the set of constants; and a second set of connections connecting the plurality of logic units, wherein the second set of connections configure the plurality of logic units to perform the graphics operation in which the graphics operation using the constants is calculated through the first set of connections, further comprising:

a storage unit, wherein the set of constants are stored in the storage unit such that recalculation of the set of constants for subsequent graphics operations is unnecessary until the set of constants change.

8. The apparatus of claim 7, wherein the storage is a set of registers.

9. A graphics pipeline comprising:

an input, wherein the input receives graphics data;

an output, wherein the output transmits processed graphics data; and a plurality of stages, wherein a first stage within the plurality of stages is connected to the input and a last stage within the plurality of stages is connected to the output, wherein a selected stage within the plurality of stages includes a plurality of modes of operation including:

a first mode of operation in which the selected stage is configured to calculate constants for use in performing a graphics operation; and a second mode of operation in which the selected stage is configured to perform the graphics operation using the constants calculated through the first mode of operation, wherein the selected stage includes comprising:

a storage unit, wherein the constants determined in the first mode of operation are stored in the storage unit such that recalculation of the constants for subsequent performance of the graphics operation is unnecessary until the set of constants change.

10. The graphics pipeline of claim 9, wherein the constants are stored in a storage device.

11. The graphics pipeline of claim 10, wherein the storage device is a set of registers.

12. The graphics pipeline of claim 9, wherein the selected stage is a fog factor generation unit.

13. The graphics pipeline of claim 9, wherein the selected stage is a viewport transformation unit.

14. The graphics pipeline of claim 9, wherein the output is connected to a raster engine.

15. The graphics pipeline of claim 14, wherein the input is connected to the raster engine.

16. The graphics pipeline of claim 15, wherein the input and the output are located in a raster interface unit.

* * * * *